United States Patent
Ganesan et al.

(10) Patent No.: US 9,378,437 B2
(45) Date of Patent: Jun. 28, 2016

(54) SENDING PRINT JOBS USING TRIGGER DISTANCES

(71) Applicant: Hewlett-Packard Development Company, L.P., Houston, TX (US)

(72) Inventors: Kumaravel Ganesan, Bangalore (IN); Rajesh Bhatia, Bangalore (IN); Ritesh Ranjan Jha, Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/779,165

(22) Filed: Feb. 27, 2013

(65) Prior Publication Data

US 2014/0240756 A1     Aug. 28, 2014

(51) Int. Cl.
| | |
|---|---|
| *G06K 15/00* | (2006.01) |
| *G06F 3/12* | (2006.01) |
| *H04L 29/08* | (2006.01) |
| *H04W 4/02* | (2009.01) |
| *H04W 4/12* | (2009.01) |

(52) U.S. Cl.
CPC ............. *G06K 15/007* (2013.01); *G06F 3/126* (2013.01); *G06F 3/1222* (2013.01); *G06F 3/1292* (2013.01); *H04L 67/18* (2013.01); *H04W 4/023* (2013.01); *H04W 4/028* (2013.01); *H04W 4/12* (2013.01)

(58) Field of Classification Search
CPC ................ G06F 3/1204; G06F 3/1268; G06F 2221/2111; H04N 1/00145; G06K 15/007
USPC ..................... 358/1.14, 1.15; 705/14.66, 333; 709/229
See application file for complete search history.

(56) References Cited

U.S. PATENT DOCUMENTS

| | | | |
|---|---|---|---|
| 6,678,750 B2 | 1/2004 | Meade et al. | |
| 6,751,732 B2 | 6/2004 | Strobel et al. | |
| 6,922,725 B2 | 7/2005 | Lamming et al. | |
| 6,952,645 B1 | 10/2005 | Jones | |
| 7,187,462 B2 | 3/2007 | Oakeson et al. | |
| 7,221,909 B2 | 5/2007 | Kiyose | |
| 7,400,425 B2 | 7/2008 | Parry | |
| 7,460,265 B2 | 12/2008 | Keeney et al. | |
| 7,512,713 B2 | 3/2009 | Wang et al. | |

(Continued)

FOREIGN PATENT DOCUMENTS

| | | |
|---|---|---|
| EP | 1691270 | 8/2006 |
| WO | WO-2005069556 | 7/2005 |

OTHER PUBLICATIONS

Enterprise Printing Solutions, http://www.printeron.com/images/docs/PrinterOnEnterprisePrintingSolutions.pdf, Jun. 15, 2012.

Alan Kasameyer, "The Top 6 Printing Rules for Saving Your Company Money," Nov. 7, 2011, 7 pages, available at http://www.sepialine.com/2013/11/07/top-6-printing-rules-saving-company-money/.

Dell Inc., "Dell Proximity Printing Solution," 2010, 3 pages, available at http://www.dell.com/downloads/global/solutions/Dell_Proxmity_Print_us.pdf?c=us&l=en&s=gen.

(Continued)

*Primary Examiner* — Jacky X Zheng
(74) *Attorney, Agent, or Firm* — Mannava & Kang, P.C.

(57) ABSTRACT

In one example, a printer address for a network-connected printer, a printer location, and an identifier for a mobile computing device are received. Responsive to receiving a message that is sent to the printer address and that includes a print job, the print job is stored. The identifier is sent to a tracker computing device. A mobile device location is received from the tracker device. Responsive to determining a calculated distance between the mobile device and the printer is less than or equal to a trigger distance, the print job is sent to the printer.

19 Claims, 7 Drawing Sheets

(56) References Cited

U.S. PATENT DOCUMENTS

| | | | |
|---|---|---|---|
| 7,756,530 B2 | 7/2010 | Taniguchi et al. | |
| 7,831,216 B1 | 11/2010 | Yenney et al. | |
| 8,001,404 B2 | 8/2011 | Pathak | |
| 8,319,999 B2 | 11/2012 | Hanaoka et al. | |
| 8,339,639 B2 | 12/2012 | St. Jacques, Jr. et al. | |
| 8,346,903 B2 | 1/2013 | Shepherd | |
| 8,369,837 B2 | 2/2013 | Huang et al. | |
| 8,386,677 B2 | 2/2013 | Lydon et al. | |
| 8,482,781 B2 | 7/2013 | Steele et al. | |
| 2002/0013869 A1 | 1/2002 | Taniguchi et al. | |
| 2002/0191210 A1 | 12/2002 | Staas et al. | |
| 2003/0038965 A1* | 2/2003 | Simpson et al. | 358/1.15 |
| 2003/0076526 A1 | 4/2003 | Gopalan | |
| 2003/0115458 A1 | 6/2003 | Song | |
| 2004/0125401 A1 | 7/2004 | Earl et al. | |
| 2004/0137928 A1 | 7/2004 | Biundo | |
| 2005/0036663 A1 | 2/2005 | Caspi et al. | |
| 2005/0174609 A1 | 8/2005 | Thurlow | |
| 2006/0044598 A1 | 3/2006 | Etelapera | |
| 2006/0252409 A1* | 11/2006 | Brenchley et al. | 455/405 |
| 2007/0124436 A1 | 5/2007 | Shepherd | |
| 2007/0127063 A1 | 6/2007 | Fertlitsch et al. | |
| 2008/0158597 A1* | 7/2008 | Hashimoto et al. | 358/1.15 |
| 2008/0239392 A1 | 10/2008 | Nanaumi | |
| 2009/0063518 A1 | 3/2009 | Jung et al. | |
| 2009/0296125 A1 | 12/2009 | Kai | |
| 2009/0319835 A1 | 12/2009 | Teranishi | |
| 2010/0020349 A1 | 1/2010 | Carroll | |
| 2010/0073707 A1 | 3/2010 | Ferlitsch | |
| 2010/0188698 A1 | 7/2010 | Koizumi | |
| 2010/0277753 A1 | 11/2010 | Shinchi | |
| 2010/0290073 A1 | 11/2010 | Nuggehalli et al. | |
| 2010/0309510 A1 | 12/2010 | Hansen | |
| 2010/0332562 A1 | 12/2010 | Emigh et al. | |
| 2011/0216349 A1 | 9/2011 | McCorkindale et al. | |
| 2011/0310428 A1 | 12/2011 | Ciriza et al. | |
| 2012/0069386 A1* | 3/2012 | St. Laurent et al. | 358/1.15 |
| 2012/0069771 A1 | 3/2012 | Tandon et al. | |
| 2012/0094694 A1 | 4/2012 | Malkin et al. | |
| 2012/0140285 A1 | 6/2012 | Kamath et al. | |
| 2012/0218600 A1 | 8/2012 | Shaw et al. | |
| 2012/0250073 A1 | 10/2012 | Juchem et al. | |
| 2012/0262753 A1 | 10/2012 | Viccari et al. | |
| 2012/0300251 A1* | 11/2012 | St. Laurent et al. | 358/1.15 |
| 2012/0307298 A1* | 12/2012 | Ishige et al. | 358/1.15 |
| 2012/0311585 A1 | 12/2012 | Gruber et al. | |
| 2013/0003126 A1 | 1/2013 | Van Osdol et al. | |
| 2013/0027718 A1 | 1/2013 | Fujii | |
| 2013/0083339 A1 | 4/2013 | Ebner et al. | |
| 2013/0107312 A1* | 5/2013 | Venkatesh | 358/1.15 |
| 2013/0322401 A1 | 12/2013 | Visuri et al. | |
| 2014/0032728 A1 | 1/2014 | O'neil et al. | |
| 2014/0085663 A1 | 3/2014 | Kavanappillil et al. | |

OTHER PUBLICATIONS

Gupta et al., "Adding GPS-Control to Traditional Thermostats: An Exploration of Potential Energy Savings and Design Challenges," Pervasive Computing, Springer Berlin Heidelberg, 2009, pp. 95-114, available at http://web.media.mit.edu/~intille/papers-files/GuptaIntilieLarson09.pdf.

Hewlett-Packard Development Company, L.P., "HP Universal Print Driver Solution and Feature Guide," 2009, 24 pages, available at http://h20331.www2.hp.com/Hpsub/downloads/UPD5_guide_final,%20web.pdf.

Konica Minolta, "Pagescope Enterprise Suite 3," Oct. 2013, 12 pages, available at http://kmbs.konicaminolta.us/wps/wcm/connect/35d0aaeb-60f8-44f2-9522-32df2184c8b5/PageScope_Brochure_Enterprise_Suite_Brochure.pdf?MOD=AJPERES&CACHEID=35d0aaeb-60f8-44f2-9522-32df2184c8b5.

Konica Minolta, "Rule-Based Printing," Jan. 2014, 4 pages, available at http://www.konicaminolta.eu/fileadmin/content/eu/Business_Solutions/Products/Applications/images/Output_Management/PageScope_MyPrint_Manager_RBP_Option_Datasheet.pdf.

Koo, S.G.M. et al., "Location Discovery in Enterprise-based Wireless Networks: Case Studies and Applications," (Research Paper), May 8, 2002, 12 pages.

Nest Community, "Use phone's location to trigger away mode," (Post & Comments), Jan. 29, 2013-May 8, 2014, 24 pages, available at https://community.nest.com/ideas/1033#.

Nest Labs, "What is Auto-Away?," Nest Support, (Web Page), May 16, 2014, 4 pages, available at http://support.nest.com/articie/What-is-Auto-Away.

Ringdale, "FollowMe Printing," (Web Page), May 16, 2014, 2 pages, available at http://www.followme.ringdale.com/applications/followme_printing/.

Skylark, "Frequently Asker Questions," May 16, 2014, 2 pages, available at http://www.skylarkios.com/faq/.

Skylark, "Skylark for Nest Learning Thermostat," May 16, 2014, 2 pages, available at http://www.skylarkios.com/.

Tomshardware.com, "How to Wakeup a Sleeping Network Printer," (Web Page), Tom's Hardware > Forum > Computer Peripherals > Printers > How to wakeup a sleeping network printer, 2000-2009, 3 pages, available at http://www.tomshardware.com/forum/62523-3-wakeup-sleeping-network-printer.

USPTO, Final Office Action issued in U.S. Appl. No. 13/076,025, filed Dec. 30, 2013, 10 pages.

USPTO, Final Office Action issued in U.S. Appl. No. 13/076,025, filed Mar. 15, 2013. 10 pages.

USPTO, Final Office Action issued in U.S. Appl. No. 13/284,213, filed May 14, 2014, 17 pages.

USPTO, Non-final Office Action issued in U.S. Appl. No. 13/076,025, filed Oct. 30, 2012, 8 pages.

USPTO, Non-final Office Action issued in U.S. Appl. No. 13/076,025, filed Sept, 13, 2013, 10 pages.

USPTO, Non-final Office Action issued in U.S. Appl. No. 13/284,213, filed Dec. 2, 2013, 17 pages.

Vision PLC, "uniFLOW—one platform for all your print, scan and device management," available Apr. 29, 2014, 3 pages, available at http://www.visionplc.co.uk/partners/uniflow-one-platform-for-all-your-print-scan-and-device-management.

Wikipedia, "Location-based service," May 7, 2014, 12 pages, available at http://en.wikipedia.org/wiki/Location-based_service.

Wikipedia, "Mobile phone tracking," May 16, 2014, 7 pages, available at http://en.wikipedia.org/wiki/GSM_localization.

Hewlett-Packard Development Company, L.P., "Cloud printing in the enterprise: Liberating the mobile print experience from cables, operating systems and physical boundaries," Mar. 2010, 8 pages, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, 2 pages. <http://h71028.www7.hp.com/enterprise/downloads/HP-Access-Control-Secure-Pull-Printing.pdf>.

Hewlett-Packard Development Company, L.P., "HP ePrint Enterprise mobile printing solution," Mar. 2010, 2 pages. <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, 2 pages. <http://www.hp.com/hpinfo/newsroom/press_kits/2010/InnovationSummit/HP_ePrint_Enterprise_Solution.pdf>.

JR Raphael, "How free Google services can help shrink your phone bill," Oct. 11, 2012, Computerworld.com, 8 pages. <http://www.computerworld.com/article/2473314/mobile-wireless/how-free-google-services-can-help-shrink-your-phone-bill.html>.

International Searching Authority, International Search Report and Written Opinion, issued in PCT Application No. PCT/US2015/012034, Mar. 30, 2015, 12 pages.

Tricerat, "Proximity Printing," Sep. 28, 2013, <http://web.archive.org/web/20130928094836/http://www.tricerat.com/resources/topics-lib.

USPTO, Final Office Action issued in U.S. Appl. No. 13/284,213, Apr. 9, 2015.

* cited by examiner

SENDING PRINT JOBS USING TRIGGER DISTANCES

BACKGROUND

Certain printers are capable of receiving communications and printable content via the internet without being connected to a desktop computer, notebook computer, or other host computing device. An advantage of such a printer is that print jobs can be received for printing from other computing devices located anywhere around the globe.

BRIEF DESCRIPTION OF THE DRAWINGS

The accompanying drawings illustrate various examples and area part of the specification. The illustrated examples do not limit the scope of the claims. Throughout the drawings, identical reference numbers designate similar, but not necessarily identical elements.

DETAILED DESCRIPTION OF EXAMPLES

In an example of a typical web-connected printer system, a job-sending computing device sends an email that includes a print job to a cloud-based internet print service. The print service receives the email, and in turn sends the print job to the destination printer for printing.

However, with typical web-connected printer systems, using emails to send print jobs can be an area of concern when the printer is utilized by or accessible to a number of users. Upon receipt of the email that includes a print job for a destination printer, the conventional email print service automatically forwards the print job to the printer for printing. As forwarding of the job to the printer occurs without a consideration of the possible personal or confidential nature of the print job, the print job may be printed at a time the intended recipient is not present. This can result in the printed output being accessible to anyone in the printer vicinity. Thus, users may be hesitant to utilize a conventional web-connected printer system in a situation where the printer is situated in a public location and/or or is utilized by multiple users.

To address these issues, examples described herein were developed and may provide a trigger distance printing service. In an example, during a setup period a trigger distance printing service ("TDPS") executing at a server or other computing device may receive, as the result of user direction during a setup activity at a computing device, an address for a network-connected printer (e.g., an email address), a location of the printer, and an IMEI number, telephone number, or other identifier for a mobile computing device. Continuing with this example, at a time period after the setup activity, the TDPS receives an email that was sent to the email address and that includes a print job, and stores the print job. The TDPS sends the identifier for the mobile device to a tracker computing device. In an example, the tracker device is a computing device other than the mobile device and other than the printer, and that tracks location of the mobile device. In another example, the TDPS receives a location of the mobile device from the tracker device. In an example, the location may be received from the tracker device as a result of the TDPS having sent a request for location information to the tracker device. In another example, the location may be received from the tracker device as a result of a regular sending of information from the tracker device to the TDPS. The TDPS calculates a distance between the mobile device and the printer. In another example, the location may be received from the tracker device as a result of a regular sending of information from the tracker device to the TDPS. The TDPS calculates a distance between the mobile device and the printer. If the TDPS determines that the calculated distance between the mobile device and the printer is less than or equal to a pre-established trigger distance, the TDPS sends the print job to the printer for printing.

In an example, the TDPS may receive the email address, the first location, and/or the identifier via a printer application that is accessed by a user at the printer. In one example, the TDPS may, e.g. during a setup period, send such printer application to the printer so as to enable a user at the printer to send the email address, the first location, and/or the mobile device identifier to the TDPS. In an example, the TDPS receives the email address, the first location, and/or the identifier via the printer application.

In an example, the TDPS receives from a user identifiers for a set of mobile computing devices that are associates with or under the control of the user. In this example, the TDPS receives from the tracker computing device mobile device location information for each of the mobile devices of the set, and calculates a distance or determines a proximity of each of the mobile devices relative to the printer. Upon determining that one of the mobile devices of the set is at a determined proximity that is less than or equal to a trigger proximity, the TDPS sends the job to the printer.

In yet another example, the email address or other printer address that the TDPS receives is a common address for a set of printers. In this example, the TDPS receives from a tracker computing device (or devices), and stores, location data for each printer of the set. The TDPS calculates distances between the mobile device and each printer of the set. In one example, the TDPS sends the print job to a selected printer among the set upon determining that the first printer is the sole printer among the set within the trigger distance of the mobile device. In another example, the TDPS determines that all the printers of the set are within the trigger distance of the mobile device, and the TDPS sends the print job to a selected printer upon determining that the selected printer is the closest, relative to the other printers of the set, to the mobile device.

Advantages of the disclosure are numerous. First, users will appreciate the location-based targeted printing made possible by the operation of the TDPS, and will be more likely to explore and utilize print-via-email functionality in situations where a network connected printer is located in a public area or in situations where the printer is utilized by multiple users. Users will be confident that their print jobs will be printed only when their smart phone or other mobile computing device indicates the user is within a trigger distance of the printer, and such users will therefore be more likely to utilize print-via-email functionality to print sensitive and confidential materials. User satisfaction with network-connected printers, cloud printing, and print-via-email services will increase.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing.

A "printer application" refers to a web application or other software application that is accessible to a user at a network-connected printer and that enables the exchange of data between the printer and computing devices external to the printer, including but not limited to retrieving content from such external computing devices. A "print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data.

As used herein, a "printer address" refers to a character string, text, image, graphic, or other element that identifies a printer. An "email address" refers to a character string, text, image, graphic, or other element that identifies an address from which electronic messages may be sent, to which electronic messages may be delivered. A "printer email address" refers to an email address that has been assigned to a printer, such that a user or device can send a print job to a printer via the printer email address. An "email" refers to a message sent electronically from one email address to another email address. A "message" refers to any communication, and is not meant to be limited to text or a character string.

As used herein, a "computing device" may be a server, computer networking device, chip set, desktop computer, notebook computer, workstation, mobile computing device, tablet computer, smartphone or any other processing device or equipment. The terms "mobile computing device" and "mobile device" are used synonymously, and refer to any portable computing device. An "identifier" refers to something, e.g., a character string that can be processed and stored by a computer, that identifies, indicates, or names a computing device. An "IMEI number" refers to an International Mobile Equipment Identity, which is a number, sometimes unique, to identify a mobile phone computing device. A "telephone number" refers to a number assigned to a telephone device (e.g., a mobile phone computing device) and is used in making connections to the device. "Distance" refers to a numerical description of how far apart objects are. "Proximity" refers to a numerical description of how near objects are. A "request" refers to a message that asks for something. "Location" refers to an object's place, position, or geographic setting.

As used herein, a "processing resource" and a "processor" are used synonymously and refer generally any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Figure 1:
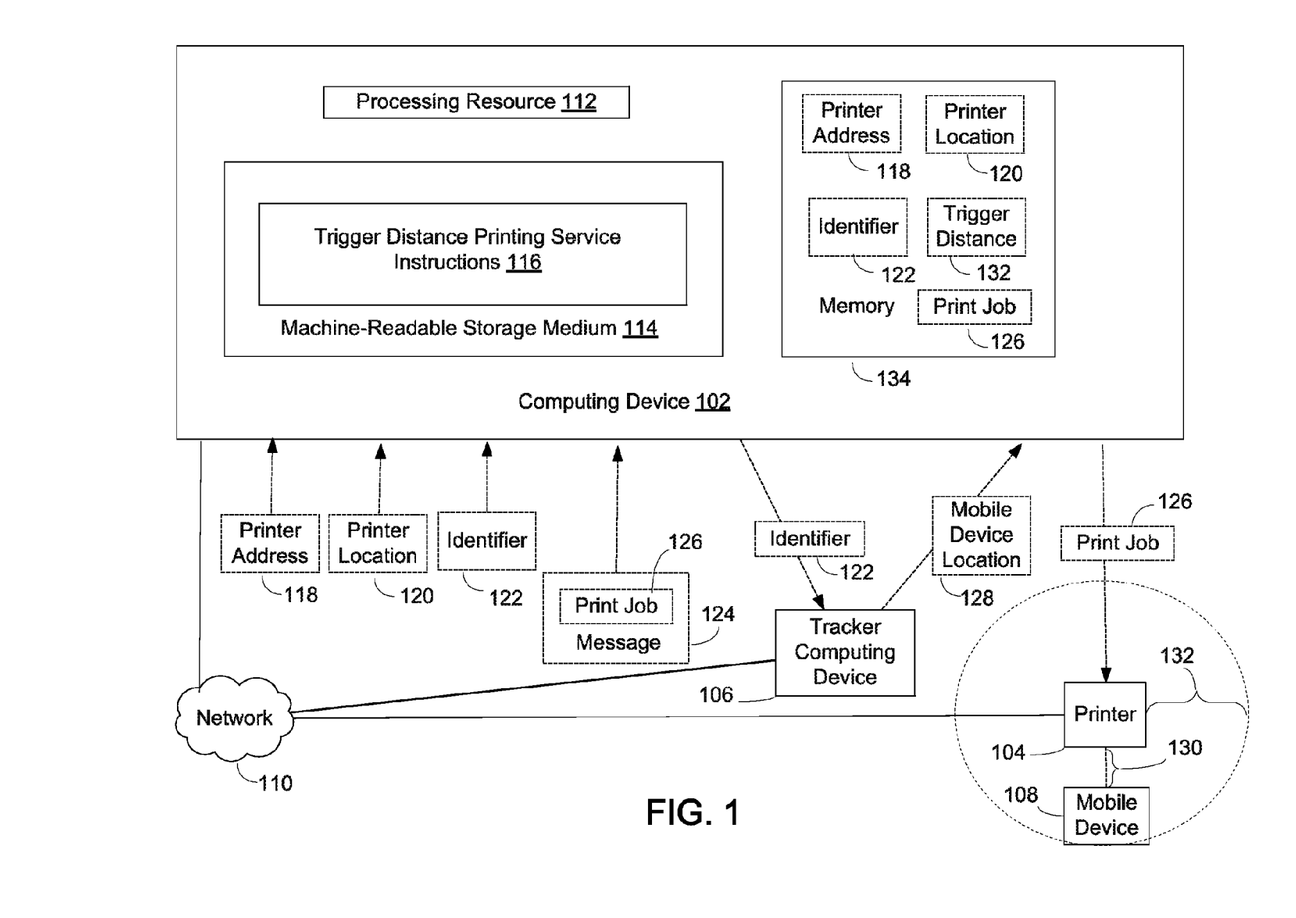
FIG. 1 is a block diagram illustrating a system, according to various examples.

Referring now to the drawings, FIG. 1 shows a computing device 102, a printer 104, a tracker computing device 106, and a mobile computing device 108, each electronically connected to a network 110. Computing device 102 represents generally any computing device or group of computing devices configured to send and receive network requests, send and receive data, and/or otherwise communicate with a network-connected printer 104 and a tracker computing device 106 via network 110. Network connected printer 104 represents generally any computing device or group of computing devices operable to produce a printed print job or printed content, and additionally operable to send and receive internet requests, receive printable content and print jobs, and otherwise communicate, via the network 110, with, the computing device 102. Tracker computing device 106 represents generally any computing device or group of computing devices configured to send and receive network requests, send and receive data, and/or otherwise communicate with the computing device 102 and the mobile computing device 108 via the network 110. Mobile computing device 108 represents generally a smartphone, tablet computer, notebook computer, or any other mobile computing device configured to send and receive network requests, send and receive data, and/or otherwise communicate with the tracker computing device 106 via the network 110.

Network 110 represents generally hardware components and computers interconnected by communications channels that allow sharing of resources and information. Network 110 may include a cable, wireless, fiber optic, or remote connection via a telecommunication link, an infrared link, a radio frequency link, or some combination of these, or any other connectors or systems that provide electronic communication. Network 110 may include, at least in part, an intranet, the Internet, or a combination of both. Network 110 may also include intermediate proxies, routers, switches, load balancers, and the like. The paths followed by network 110 between the computing device 102, printer 104, tracker computing device 106, and mobile computing device 108 as depicted in FIG. 1 represent the logical communication paths between these devices, not necessarily the physical paths between the devices.

In an example, computing device 102 includes a processing resource 112 and a machine-readable storage medium 114 encoded with instructions 116. In an example, the instructions 116 cause computing device 102 to implement a trigger distance printing service that determines a calculated distance or proximity relative to a mobile computing device, and sends a print job to printer 104 if the calculated distance is less than or equal to a pre-established trigger distance. In some examples, storage medium 114 may include additional instructions. In other examples, instructions 116 and any other instructions described herein in relation to storage medium 114 may be stored on a machine-readable storage medium remote from but accessible to computing device 102 and processing resource 112.

Processing resource 112 may fetch, decode, and execute instructions stored on storage medium 114 to implement the functionalities described below. In other examples, the functionalities of any of the instructions of storage medium 114 may be implemented in the form of electronic circuitry, in the form of executable instructions encoded on a machine readable storage medium, or a combination thereof.

In examples, computing device 102 may be a server. In some examples, computing device 102 may implement at least a portion of a trigger distance printing service. In some examples, instructions 116 may be part of a larger set of instructions implementing a trigger distance printing service. In some examples, portions of a trigger distance printing service may be implemented on different computing devices.

In the example of FIG. 1, the instructions 116 stored at machine readable storage medium 114 cause computing device 102 to receive data indicative of a printer address 118 for printer 104, and a location 120 of the printer 104. In an example, the printer address 118 is an email address for the printer 104. The instructions also cause the computing device 102 to receive an identifier 122 for the mobile computing device 108. In an example where the mobile computing device 108 is a smartphone, the identifier 122 may be an IMEI number or telephone number for the smart phone. In other examples, the identifier 122 can be a character string or any that data that can be processed and stored by a computer to identify, indicate, or name the mobile device 108.

The instructions cause the computing device 102 to receive a message 124 sent to the printer address 118, the message 124 including a print job 126. In an example in which the printer address 118 is an email address, the message 124 may be an email address for the printer 104. Responsive to receipt of the message 124, the instructions 116 cause the computing device 102 to store the print job 126.

The instructions 116 cause the computing device 102 to send the identifier 122 to the tracker computing device 106. In this example, the tracker computing device 106 is a computing device separate and distinct from the computing device 102 and the printer 104. In the example of FIG. 1, the identifier 122 is sent to the tracker computing device 106 at a time after the computing device 102 receives the message 124 and stores the print job 126. In other examples, the instructions 116 may cause the computing device 102 to send the identifier 122 to the tracker computing device 106 at a time after the computing device 102 receives the printer address, the printer location, and the identifier, but prior to the receipt of the message 124 that includes the print job 126. In an example, the tracker computing device 106 may be a computing device that hosts a telecom provider's real-time mobile device location service.

Continuing with the example of FIG. 1, at a time after the sending of the identifier 122 to the tracker computing device 106, the instructions 116 cause the computing device 102 to receive a mobile device location 128 from the tracker computing device 106. In an example, the mobile device location 128 may include longitude, latitude, and/or an altitude data. In an example, the mobile device location 128 data may be in the form of GPS coordinates. In an example, the tracker computing device 106 may be configured to repeatedly send mobile device location updates to computing device 102. In another example, the tracker computing device 106 may be configured to send mobile device location 128 data to computing device 102 responsive to receipt of a specific request sent by computing device 102.

After receipt of the mobile device location 128 data, the instructions cause the computing device 102 to calculate a distance 130 between the mobile device 108 and the printer 104. In an example, the distance calculation is made utilizing the received mobile device location 128 data. In the example of FIG. 1, the instructions 116 cause the computing device 102 to compare the calculated distance 130 to a trigger distance 132 that is stored at computing device 102. In the example of FIG. 1, responsive to the computing device 102 determining the calculated distance 130 is less than or equal to a trigger distance 132, the instructions 116 cause the computing device 102 to send the print job 126 to the printer 104 for printing. In an example, the trigger distance 132 is a predetermined distance that is stored in a memory 134 at, or accessible to, computing device 102. In an example, the trigger distance 132 may be a distance value that is established by a user and sent to the computing device 102 as part of a trigger distance printing service setup routine. In another example, the trigger distance 132 may be a default value that is stored at, or accessible to, computing device 102 without any user activity to establish the trigger distance. In an example, upon receipt of the print job 126 from the computing device 102, the printer 104 performs a printing operation to create a hard copy version or facsimile of the print job 126.

In some examples, instructions 116 may be part of an installation package that, when installed, may be executed by processing resource 112 to implement the functionalities described herein in relation to instructions 116. In such examples, storage medium 114 may be a portable medium, such as a CD, DVD, or flash drive, or a memory maintained by a server from which the installation package can be downloaded and installed. In other examples, instructions 116 may be park of an application or applications already installed on computing device 102 including processing resource 112. In such examples, the storage medium 114 may include memory such as a hard drive, solid state drive, or the like. While in the example of FIG. 1 the storage medium 114 and memory 134 appear as separate components or modules, in other examples some or all of memory 134 may be included within or a part of storage medium 114. In yet other examples, some or all of storage medium 114 may be included within or be a part of memory 134. In some examples, functionalities described herein in relation to FIG. 1 may be provided in combination with functionalities described herein in relation to any of FIGS. 2, 4 and 5.

Figure 2:
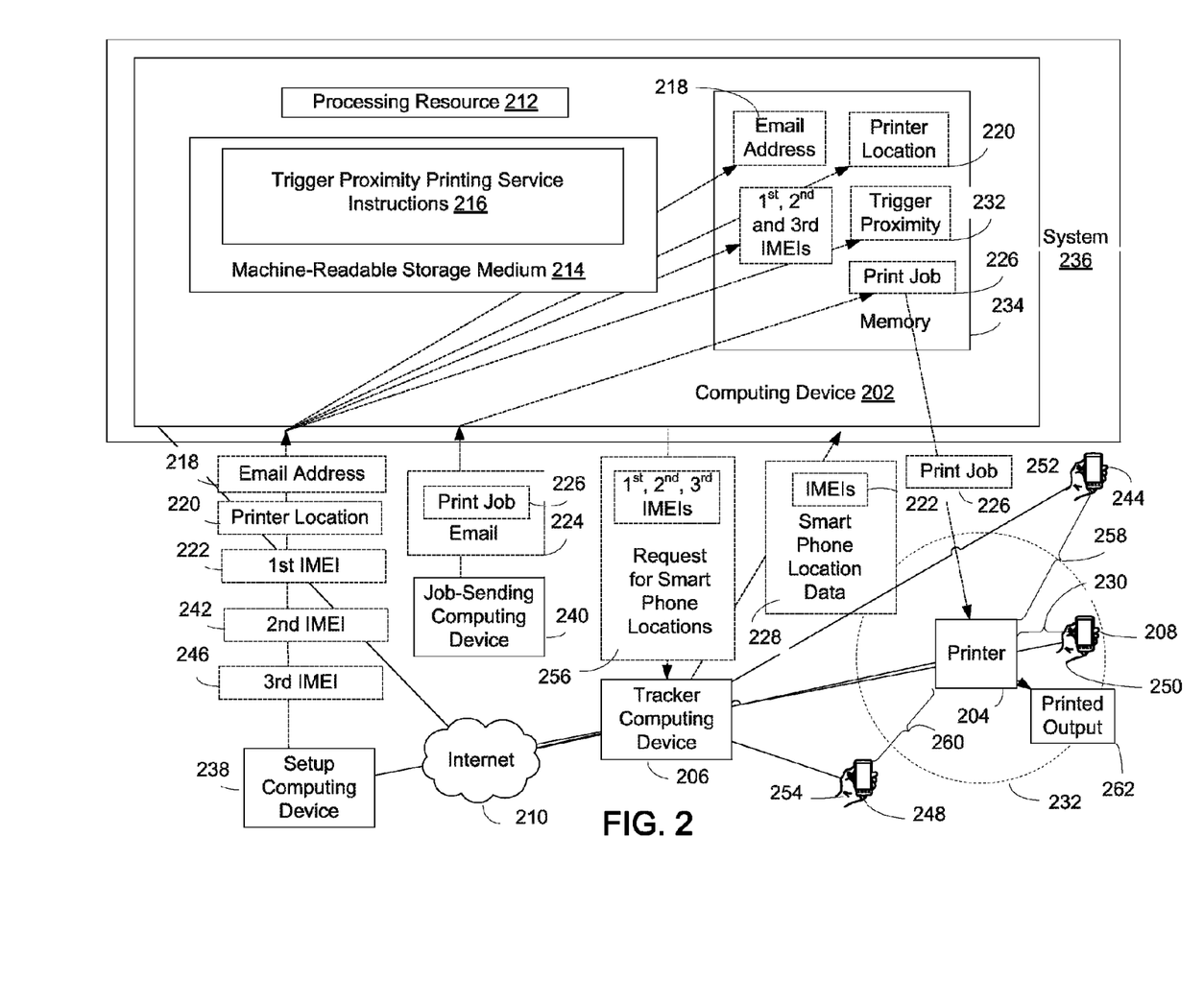
FIG. 2 is a block diagram illustrating a system, according to various examples.

FIG. 2 is a block diagram of an example computing system 236 to host a trigger proximity printing service. In the example of FIG. 2, a system 236 may include a computing device 202, substantially similar to the computing device 102 described above in relation to FIG. 1. For example, computing device 202 may include processing resource 212, and a storage medium 214 including instructions 216, substantially similar to the processing resource 112, storage medium 114, and instructions 116 as described above in relation to FIG. 1. In some examples, storage medium 214 may include additional instructions. In other examples, instructions 216 and any other instructions described herein in relation to storage medium 214 may be stored on a machine-readable storage medium remote from but accessible to computing device 202 and processing resource 212.

In addition to system 236 and computing device 202, FIG. 2 shows a printer 204, a setup computing device 238, a tracker computing device 206, a smart phone smart phone 208, and a job sending computing device 240, each electronically connected to an internet 210. In the example of FIG. 2, the printer 204, tracker computing device 206, and the smart phone 208 may be substantially similar to the printer 104, tracker computing device 106, and mobile computing device 108 described above in relation to FIG. 1. Setup computing device 238 represents generally any computing device or group of computing devices configured to send and receive network requests, send and receive data, (including but not limited to an email address, a printer location and/or an identifier for a mobile device), and/or otherwise communicate with the computing device 202 via the internet 210. Job-sending computing device 240 represents generally any computing device or group of computing devices configured to send and receive network requests, send and receive data, (including but not limited to an email or other message that includes a print job), and/or otherwise communicate with the computing device 202 via the internet 210.

Internet 210 represents generally hardware components and computers interconnected by communications channels that allow sharing of resources and information. Internet 210 may include a cable, wireless, fiber optic, or remote connection via a telecommunication link, an infrared link, a radio frequency link, or some combination of these, or any other connectors or systems that provide electronic communication. Internet 210 may be or include, at least in part, an intranet, the Internet, or a combination of both. Internet 210 may also include intermediate proxies, routers, switches, load balancers, and the like. The paths followed by internet 210 between the computing device 202, the setup computing device 238, the job-sending computing device 240, the smart phone mobile computing device 208, and the printer 204 as depicted in FIG. 2 represent the logical communication paths between these devices, not necessarily the physical paths between the devices.

In the example of FIG. 2, the instructions 216 stored at machine readable storage medium 214 cause computing device 202 to receive a printer address, in the form of an email address 218, for printer 204. In an example, the email address 218 may be received at computing device 202 from a setup computer device 238 as the result of user interaction with the setup computer device 238.

Figure 3A:
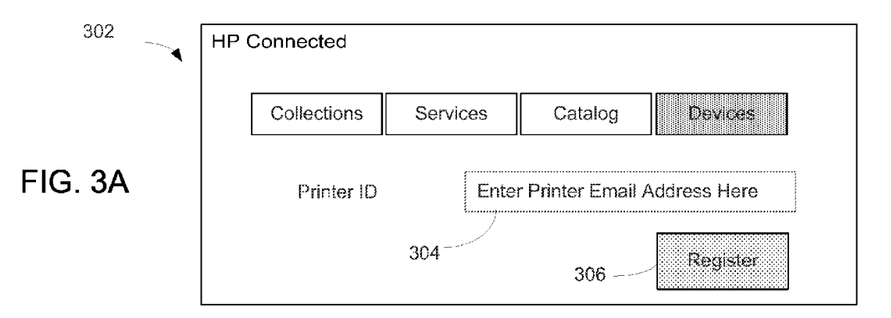
FIG. 3A is an example of a user interface to facilitate the receiving of a printer address, according to various examples.

Moving to FIG. 3A, in an example, the setup computing device 238 may host a trigger proximity printing setup application to enable a user to send the email address 218 for printer 204 to computing device 202. In an example, the trigger proximity printing setup application may be included as part of a broader print-via-email printer setup application. FIG. 3A illustrates an example screenshot of a graphic user interface ("GUI") 302 that may be provided to a user by a trigger proximity printing setup application executing at, or accessible at, setup computing device 238. In an example, the GUI 302 may be in the form of a print dialog window or a printer selection screen, such that a user may utilize a computer mouse, pointer, voice recognition programming, or other electronic devices or applications to interact with icons or other elements of the GUI 302. In the example of FIG. 3A, a user directs the sending of a printer email address, e.g., "Kumarevel'sPrinter@hpeprint.com" from setup computing device 238 to computer system 202 by using a keyboard or keypad user interface to type the email address 218 in a printer email address field 304. Responsive to the user entering the printer email address 218 in the GUI field 304 and interacting with the "Register" button 306, the setup computing device 238 sends the printer email address 218 to computing device 202. In an example, upon receipt of the email address 218 at computing device 202, the instructions 216 cause the computing device to store the email address 218 in memory 234.

Returning to the example of FIG. 2, the instructions 216 cause computing device 202 to receive a printer location 220 for printer 204. In an example, the printer location 220 may be received at computing device 202 from a setup computer device 238 as the result of user interaction with the setup computer device 238.

Figure 3B:
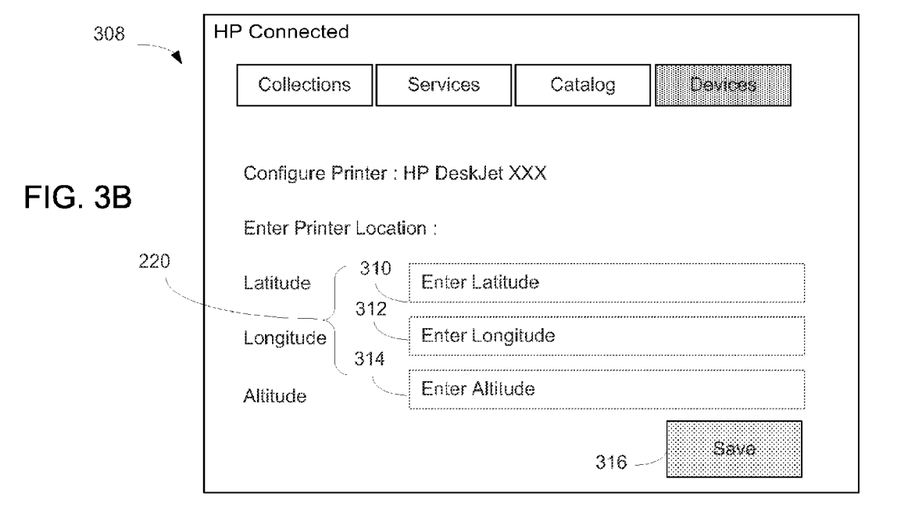
FIG. 3B is an example of a user interface to facilitate the receiving of a printer location, according to various examples.

Moving to FIG. 3B, in an example, the setup computing device 238 may host a trigger proximity printing setup application to enable to send the printer location 220 for printer 204 to computing device 202. FIG. 3B illustrates an example screenshot of a GUI 308 that may be provided to a user by a trigger proximity printing setup application executing at, or accessible at, setup computing device 238. In an example, the GUI 308 may be in the form of a print dialog window or a printer selection screen, such that a user may utilize a computer mouse, pointer, voice recognition programming, or other electronic devices or applications to interact with icons or other elements of the GUI 308. In the example of FIG. 3B, a user directs the sending of printer location 220 information from the setup computing device 238 to computer system 202 by using a keyboard or keypad user interface to type the printer location 220 information in printer email address fields 308, 310 and 312. In this example, the GUI 308 provides for display to a user, e.g., via a monitor or screen, a "latitude" field 308, a "longitude" field 310, and an "altitude" or elevation field 312. In this example, responsive to the user entering the latitude, longitude, and altitude printer location 220 information in the GUI fields 308, 310 and 312, and the user interacting with the "Save" button 314, the setup computing device 238 sends the printer location 220 information to computing device 202. In an example, upon receipt of the printer location 220 information at computing device 202, the instructions 216 cause the computing device 202 to store the printer location 220 information in memory 234.

Returning to the example of FIG. 2, the instructions 216 cause computing device 202 to receive an IMEI identifier 222 for smart phone 208. In an example, the IMEI identifier 222 may be received at computing device 202 from a setup computer device 238 as the result of user interaction with the setup computer device 238.

Figure 3C:
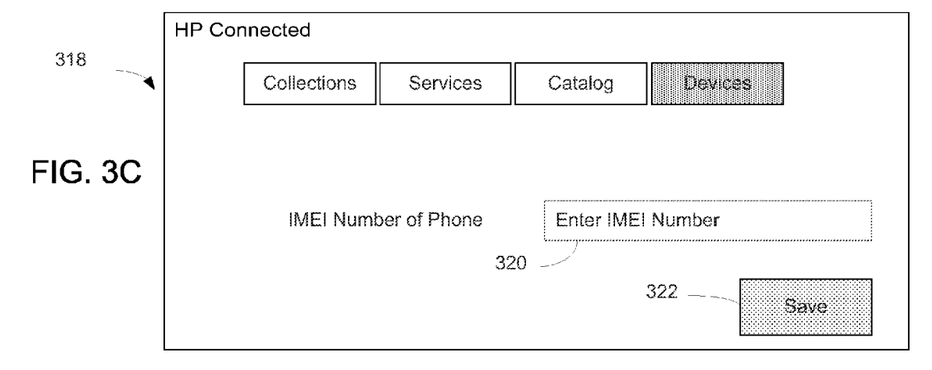
FIG. 3C is an example of a user interface to facilitate the receiving of an identifier for a mobile computing device, according to various examples.

Moving to FIG. 3C, in an example, the setup computing device 238 may host a trigger proximity printing setup application to enable to send the IMEI identifier 222 for printer 204 to computing device 202. FIG. 3C illustrates an example screenshot of a GUI 318 that may be provided to a user by a trigger proximity printing setup application executing at, or accessible at, setup computing device 238. In an example, the GUI 318 may be in the form of a print dialog window or a printer selection screen, such that a user may utilize a computer mouse, pointer, keyboard, keypad, voice recognition programming, or other electronic devices or applications to interact with icons or other elements of the GUI 318. In this example, the GUI 318 provides for display to a user, e.g., via a monitor or screen, an "IMEI Number" field 320 and invites the user to enter an IMEI number associated with a smart phone mobile computing device that the user keep close at hand, e.g. on the user's person in the ordinary course of events, while at work, or while collecting printed print jobs. In this example, responsive to the user entering the IMEI identifier 222 in the IMEI Number GUI field 320, and the user interacting with the "Save" button 322, the setup computing device 238 sends the IMEI identifier 222 to computing device 202. In an example, upon receipt of the printer location 220 information at computing device 202, the instructions 216 cause the computing device 202 to store the IMEI identifier 222 in memory 234.

Figure 3D:
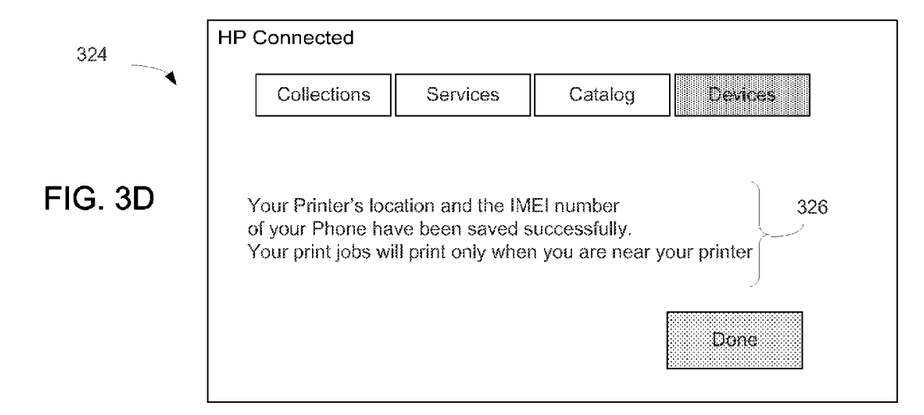
FIG. 3D is an example of a message regarding completion of a trigger proximity printing setup procedure, according to various examples.

FIG. 3D illustrates an example screenshot of a message 324 that may be provided to a user by a trigger proximity printing setup application executing at, or accessible at, setup computing device 238. In an example, the message 324 may be presented in the form of a remarks window or view that displays text to inform the user that a trigger proximity printing setup procedure is completed. In the example of FIG. 3D, the message is "Your Printer's location and the IMEI number of your Phone have been saved successfully. Your print jobs will print only when you are near your printer."

To this point, it has been discussed in the example of FIG. 2 that the instructions 216 may cause the computing device 202 to receive an IMEI number 222 for a first smart phone 208. For purposes of continuing with the example of FIG. 2, it can be assumed the first smart phone 208 is a smart phone of a first user 250. The instructions 216 may also cause the computing device 202 to receive IMEI numbers for additional mobile computing devices, e.g., a second IMEI number 242 for a second smart phone mobile computing device 244, and a third IMEI number 246 for a third smart phone mobile computing device 248.

In an example use case, a user may provide the first, second and third IMEI numbers 222 242 246 to set in place a trigger proximity printing process whereby a print job will be released when any of three smart phones are within a trigger proximity of the printer 204. This can be useful when the first user may, on a given day, carry one of several smart phones.

This can also be useful in a situation where each of the first, second and third smart phones 208 244 254 associated with a distinct user (first user 250, second user 252, and third user 254, respectively) in a set of authorized users. For example, an administrative user may set the multiple smart phone trigger proximity printing service in place with the intent that a print job will be sent to printer 204 for printing when any of the set of users (as indicated by the presence of the users' smart phones) is within the trigger proximity of printer 204.

In another example of the disclosure, the first, second, and third IMEI numbers 222 242 246 may be received by the computing device 202 as a result of separate setup transactions by the first, second, and third users 250 252 254. For example, printer 204 may be an enterprise printer, and each of the first, second, and third users 250 252 254 may be enterprise users with system authorization to add their smart phones to a list of mobile devices that will trigger printing of print jobs at printer 204 by virtue of being within a trigger proximity of printer 204.

Continuing with the example of FIG. 2, the instructions 216 cause the computing device 202 to receive an email message 224, sent to the email address 218. The message 224 includes a print job 226. In an example, the email is received a result of a user at job-sending computing device 240 having utilized an email application to address and send the email 224 to the printer email address 218. Responsive to receipt of the message 224 at computing device 202, the instructions 216 cause the print job 226 to be stored in memory 220.

In the example of FIG. 2, the instructions 216 cause the computing device 202 to send the tracker computing device 206, after the receipt of the email 224, a request 256 for current locations of the first, second, and third smart phones 208 244 248. In an example, the instructions 216 cause the computing device 202 to send the first, second, and third IMEI numbers 222 242 246 to the tracker device 206 as part of, or with, the request 256 for the locations of the smart phones 208 244 248.

Following the sending of the request 256 to the tracker computing device 206, the tracking computing device 206 sends, and the instructions 216 cause the computing device 202 to receive, location data 228 for each of the first, second, and third smart phones 208 244 248. After receipt of the smart phone mobile device location data 228 the instructions 216 cause the computing device 202 to determine a proximity 230, for each of the first, second and third smart phones 208 244 248, between the smart phone and the printer 204. In an example, a first proximity 230 of two meters is determined for the first smart phone 208, a second proximity 258 of fifteen meters is determined for the second smart phone 244, and a third proximity 260 of twelve meters is determined for the third smart phone 248. In an example, the determinations are made at computing device 202 utilizing the received smart phone location data 228.

The instructions 216 cause the computing device 202 to compare the determined proximities to a trigger proximity 232 that is stored at computing device 202. In this example, the trigger proximity 232 is a predetermined proximity of three meters that is stored in a memory 234 at, or accessible to, computing device 202. In other examples, the trigger proximity may be established by a user during a trigger printing setup procedure.

The instructions 216 causing computing device 202 to determine that a proximity of at least one of the first, second, and third smart phones 230 244 248 relative to the printer 204 is less than or equal to the trigger proximity 232. In this example, the first smart phone 208 is at a proximity of the printer 204 that is less than or equal to the trigger proximity 232. Responsive to such determination, the instructions 216 cause the computing device 202 to send the print job 226 to the printer 204 for printing to create printed output 262.

In some examples, instructions 216 may be part of an installation package that, when installed, may be executed by processing resource 212 to implement the functionalities described herein in relation to instructions 216. In such examples, storage medium 214 may be a portable medium, such as a CD, DVD, or flash drive, or a memory maintained by a server from which the installation package can be downloaded and installed. In other examples, instructions 216 may be part of an application or applications already installed on computing device 202 including processing resource 212. In such examples, the storage medium 214 may include memory such as a hard drive, solid state drive, or the like. While in the example of FIG. 2 the storage medium 214 and memory 234 appear as separate components or modules, in other examples some or all of memory 234 may be included within or a part of storage medium 214. In some examples, functionalities described herein in relation to FIG. 2 may be provided in combination with functionalities described herein in relation to any of FIGS. 1, 4 and 5.

Figure 4:
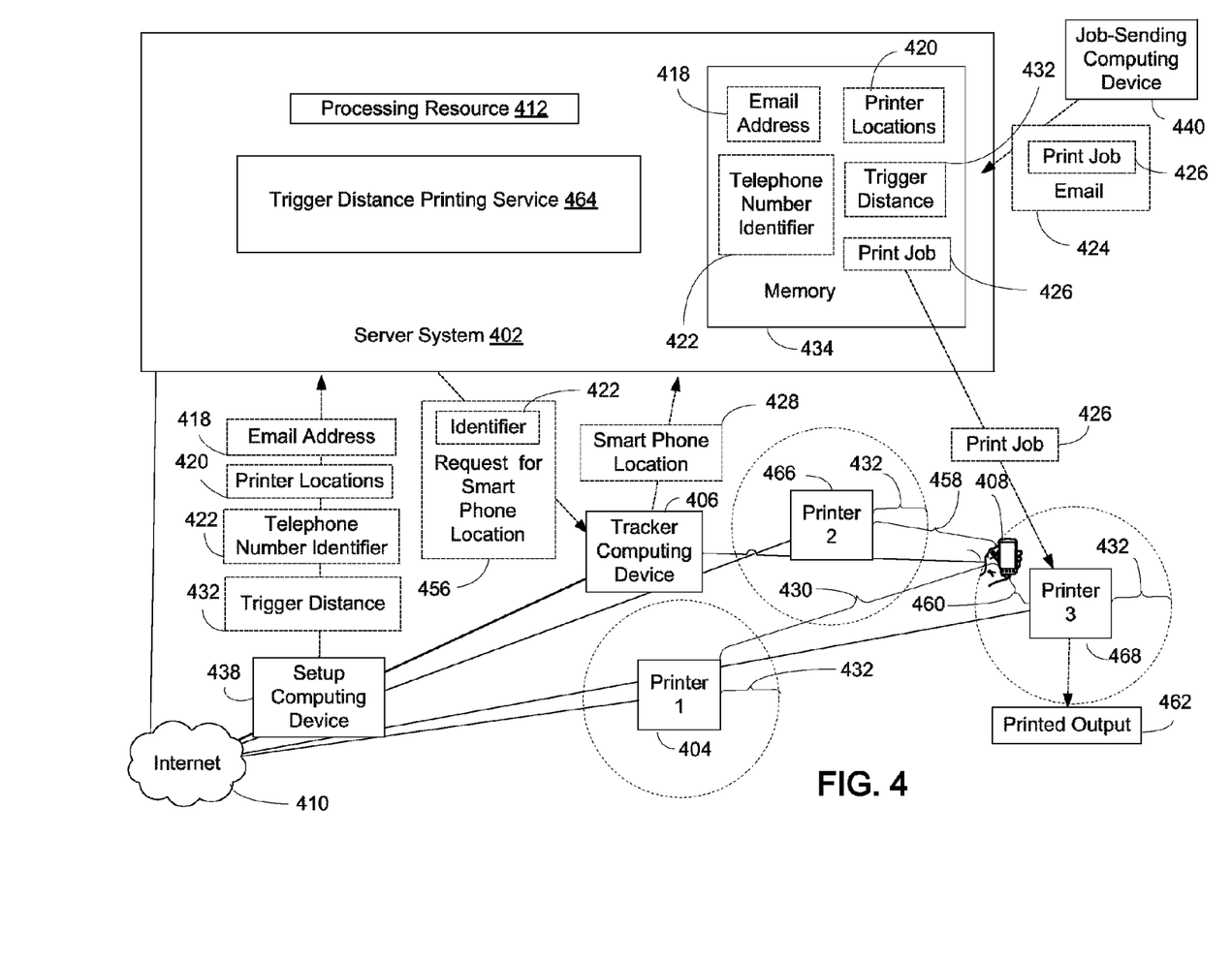
FIG. 4 is a block diagram illustrating a system, according to various examples.

FIG. 4 is a block diagram illustrating a system according to various examples. FIG. 4 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 4 shows a server system 402, a setup computing device 438, a job-sending computing device 440, a tracker computing device 406, a smart phone mobile computing device 408, a first printer 404, a second printer 466, and a third printer 468. The server system 402 is electronically connected to the setup computing device 438, the job-sending computing device 440, and the tracker computing device 406 via an internee 406.

Server system 402 represents generally any computing device or group of computing devices configured to send and receive network requests, send and receive data, and/or otherwise communicate with setup computing device 438, job-sending computing device 440, tracker computing device 406, and first, second and third network-connected printers 404 466 468 via internet 410.

Setup computing device 438 represents generally any computing device or group of computing devices configured to send and receive network requests, send and receive data, (including but not limited to an email address, printer location data, a trigger distance, and/or an identifier or a mobile device), and/or otherwise communicate with the server system 402 via the internet 410. Job-sending computing device 440 represents generally any computing device or group of computing devices configured to send and receive network requests, send and receive data, (including but not limited to an email or other message that includes a print job), and/or otherwise communicate with the server system 402 via the internet 410. Tracker computing device 406 represents generally any computing device or group of computing devices configured to send and receive network requests, send and receive data, and/or otherwise communicate with the server system 402 and the smart phone 408 via the internet 410. Smart phone 408 represents generally a smartphone, tablet computer, notebook computer, or any other mobile computing device configured to send and receive network requests, send and receive data, and/or otherwise communicate with the tracker computing device 406 via the internet 410. Internet 410 represents generally hardware components and computers interconnected by communications channels that allow sharing of resources and information. Internet 410 may be or include, at least in part, an intranet, the Internet, or a combination of both. First, second, and third network connected printers 404 466 468 each represents generally any computing device or group of computing devices operable to produce a printed print job or printed content, and additionally operable to send and receive internet requests, receive printable content and print jobs, and otherwise communicate, via the internet 410, with, the server system 402.

Server system 402 is shown to include a trigger distance printing service 464, a processing resource 412, and a memory 434. Memory 434 represents generally any memory configured to store program instructions and other data.

In the example of FIG. 4, the TDPS 464 executing at the server system 402 receives a printer address, in the form of an email address 418, that is a common address for a set of printers that includes first printer 404, second printer 466, and third printer 468. In an example in which the first, second, and third printers 404 466 468 may be printers included within a set of printers located on floors 2 and 3 of an enterprise "Building A", the common email address 418 may be "Building_A_Floors_2_and_3@hpeprint.co." In an example of a common printer email, an email address, a print job that is sent to the common email address 418 may be printed at any of the first, second, or third printers 404 466 468 according to a rule.

In an example, the common email address 418 may be received at server system 402 from setup computer device 438 as the result of user interaction with the setup computer device 438. In an example, the user interaction with the setup computer device 438 may be that of an administrative user. In an example, upon receipt of the common email address 418 at server system 402, the TDPS 464 causes the common email address 418 to be stored in memory 434.

The TDPS 464 receives printer location 420 information for each of the first, second, and third printers 404 466 468. In an example, the printer location 420 information may be received at the TDPS 464 from setup computer device 438 as the result of user interaction with the setup computer device 438. In an example, upon receipt of the printer location 420 information at server system 402, the TDPS 464 causes the printer location 420 information to be stored in memory 434.

The TDPS 464 receives a telephone number identifier 422 for smart phone 408. In an example, the telephone number identifier 422 may be received at server system 402 from a setup computer device 438 as the result of user interaction with the setup computer device 438. In an example, upon receipt of the telephone number identifier 422 at server system 402, the TDPS 464 causes the telephone number identifier 422 to be stored in memory 434.

Continuing with the example of FIG. 4, the TDPS 464 receives a "one meter" trigger distance value 432. In an example, the trigger distance may be received at server system 402 from a setup computer device 438 as the result of user interaction with the setup computer device 438. In an example, upon receipt of the trigger distance value 432 at server system 402, TDPS 464 causes the trigger distance 432 to be stored in memory 434. In this example, a single trigger distance is received that is applicable to each of the first, second, and third printers 404 466 468. It should be noted that in other examples the TDPS 464 may receive a unique trigger distance for some or all of the first, second, and third printers 404 666 468.

The TDPS 464 receives an email message 424 that was sent to the email address 418. The message 424 includes a print job 426. In an example, the email 424 is received a result of a user at job-sending computing device 440 having utilized an email application to address and send the email 424 to the common printer email address 418. Responsive to receipt of the message 424 at server system 402, the TDPS 464 causes the print job 426 to be stored in memory 420.

The TDPS sends to the tracker computing device 406, after the receipt of the email 424, a request 456 for the location of the smart phone 408. In an example, the instructions cause the server system 402 to send the telephone number identifier 422 to the tracker device 406 as part of, or with, the request 456 for the location of the smart phone 408. Following the sending of the request 456 to the tracker computing device 406, the tracking computing device 406 sends, and the TDPS 464 receives, location data 428 for the smart phone 408.

Continuing with the example of FIG. 4, after receipt of the smart phone location data 428 from the tracker computing device 406, the TDPS 464 determines a distance 430 between the smart phone 408 and each of the first, second, and third printers 404 466 468. In an example, a first distance 430 of 30 meters is determined for the first printer 404, a second distance 458 of 3 meters is determined for the second printer 466, and a third distance 460 of 1 meter is determined for the third printer 468. In an example, the determinations are made at server system 402 utilizing the received smart phone location data 428.

The TDPS 464 compares the determined first, second, and third distances 430 458 460 to the "1 meter" trigger distance 432 that is stored at server system 402. In this example, the trigger distance is a value that was established by a user during a trigger printing setup procedure. In other examples, the trigger distance 432 is a predetermined distance that is stored in a memory 434 at, or accessible to, server system 402.

The TDPS 464 determines that the third printer 468 is the sole printer among the set within the 1 meter trigger distance 432 of the smart phone 408. In an example, the TDPS 464 determines that the third distance 460 (from the third printer 468 to the smart phone 408) is the sole distance among the first, second and third distances 430 458 460 that is less than or equal to the trigger distance 432.

In another example, the TDPS 464 may apply a different trigger distance rule upon determining that more than one of the first, second and third printers 404 466 468 is within the trigger distance 432 of the smart phone 408. In this example, where a set of printers are within the trigger distance of the smart phone 408, the TDPS 464 may determine which printer among the set is the closest to the smart phone and then send the print job 426 to that closest printer.

In examples, the TDPS 464 may receive the email address 418, printer location information 420, telephone number identifier 422, trigger distance 432, the email 424 that includes the print job 426, and/or the smart phone location 428, and the TDPS 464 may send the request 456 and the print job 426, over the network 410 via a networking protocol, including but not limited to Transmission Control Protocol/Internet Protocol ("TCP/IP"), HyperText Transfer Protocol ("HTTP"), and/or Session Initiation Protocol ("SIP").

The functions and operations described with respect to the TDPS 464 and the server system 402 may be implemented as a non-transitory computer-readable storage medium containing instructions executed by a processor (e.g., processing resource 412) and stored in a memory (e.g., memory 434). In a given implementation, processing resource 412 may represent multiple processors, and memory 434 may represent multiple memories.

Figure 5:
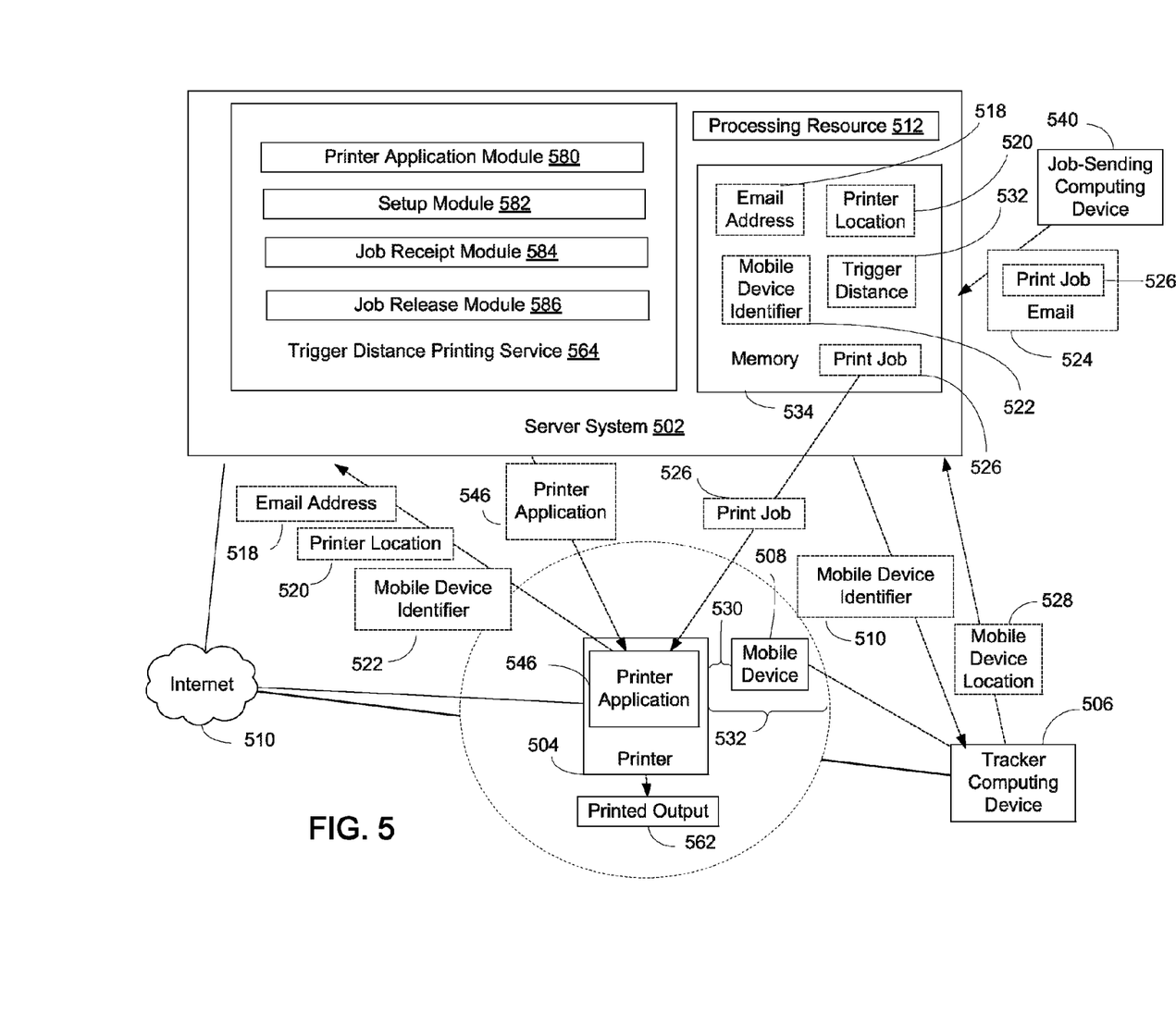
FIG. 5 is a block diagram illustrating a system, according to various examples.

FIG. 5 is a block diagram illustrating a system according to various examples. FIG. 5 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 5 shows a server system 502, a job-sending computing device 540, a tracker computing device 506, a mobile computing device 508, and a printer 504. The server system 502 is electronically connected to the job-sending computing device 540, the tracker computing device 506, and the printer 504 via an internet 506.

Server system 502 represents generally any computing device or group of computing devices configured to send and receive network requests, send and receive data, and/or otherwise communicate with the job-sending computing device 540, tracker computing device 506, and printer 504 via internet 510. Tracker computing device 506 represents generally any computing device or group of computing devices configured to send and receive network requests, send and receive data, and/or otherwise communicate with the server system 502 and the mobile computing device 508 via the internet 510. Mobile computing device 508 represents generally a smartphone, tablet computer, notebook computer, or any other mobile computing device configured to send and receive network requests, send and receive data, and/or otherwise communicate with the tracker computing device 506 via the internet 510. Internet 510 represents generally a network, and may be, or may include at least in part, an intranet, the Internet, or a combination of both. Printer 504 represents generally any computing device or group of computing devices operable to produce a printed print job or printed content, and additionally operable to send and receive internet requests, receive printable content and print jobs, and otherwise communicate, via the internet 510, with, the server system 502.

Server system 502 is shown to include a trigger distance printing service 564, a processing resource 512, and a memory 534. The trigger distance printing service ("TDPS") 564 includes a printer application module 580, a setup module 582, a job receipt module 584, and a job release module 586. Memory 534 represents generally any memory configured to store program instructions and other data.

In the example of FIG. 5, the printer application module 580 executing at the server system 502 sends to printer 504 a printer application 546. In an example, the printer application 546 is an application to enable a user at the printer 504 to send and receive data, including but not limited to sending email addresses, printer locations, mobile device identifiers and/or trigger distance values to server system 502. In an example, the printer application is an application that executes at printer 504. In another example, printer application 546 is an application that executes at a computing device separate from printer 504, but is accessible to a user at printer 504. In yet another example, printer application 546 is an application that executes at server system 502 and is accessible to a user at printer 504. In an example, printer application 546 is, or provides access to, a web application.

Setup module 582 receives a printer address, in the form of an email address 518 for printer 504. In the example of FIG. 5, an example, the email address 518 may be received at server system 502 from printer 504, as the result of user interaction with the printer 504 via the printer application 546. In an example, upon receipt of the email address 518 at server system 502, the setup module 582 causes the server system 502 to store the email address 518 in memory 534.

Setup module 582 receives printer location 520 information for printer 504. In an example, the printer location 520 information may be received at the TDPS 564 from printer 504 as the result of user interaction with the printer 504 via the printer application 546. In an example, upon receipt of the printer location 520 information at TDPS 564, the setup module 582 causes the server system 502 to store the printer location 520 information in memory 534.

Continuing with the example of FIG. 5, the setup module 582 receives a mobile device identifier 522 for mobile computing device 508. In an example, the mobile device identifier 522 may be received at server system 502 from a printer 504 via the printer application 546 as the result of user interaction with the printer 504 via the printer application 546. In an example, upon receipt of the mobile device identifier 522 at server system 502, the setup module 582 causes the server system 502 to store the mobile device identifier 522 in memory 534. In an example, the setup module may additionally receive a trigger distance value as a result of user interaction with the printer via the printer application 546.

The job receipt module 584 receives an email message 524, sent to the email address 518. The message 524 includes a print job 526. In an example, the email 524 is received a result of a user at the job-sending computing device 540 having utilized an email application to address and send the email 524 to the printer email address 518. Responsive to receipt of the message 524 at server system 502, the job receipt module 584 causes the print job 526 to be stored in memory 520.

The job release module 586 receives, from tracker computing device 506, location data 528 for mobile device 508. After receipt of the mobile device location data 528, the job release module 586 determines a distance 530 between the mobile device 508 and the printer 504. The job release module 586 compares the determined distance 530 to a trigger distance 532 that is stored at server system 502. If the determined distance 530 between the mobile device 508 and the printer 5082 is less than or equal to the trigger distance 532, the job release module 586 sends the print job 526 to the printer 504 for printing. Printer 504 in turn performs a printing process upon a media to generate printed output 562, a hard copy version of print job 526.

The functions and operations described with respect to the TDPS 564 and the server system 502 may be implemented as a non-transitory computer-readable storage medium containing instructions executed by a processor (e.g., processing resource 512) and stored in a memory (e.g., memory 534). In a given implementation, processing resource 512 may represent multiple processors, and memory 534 may represent multiple memories.

Figure 6:
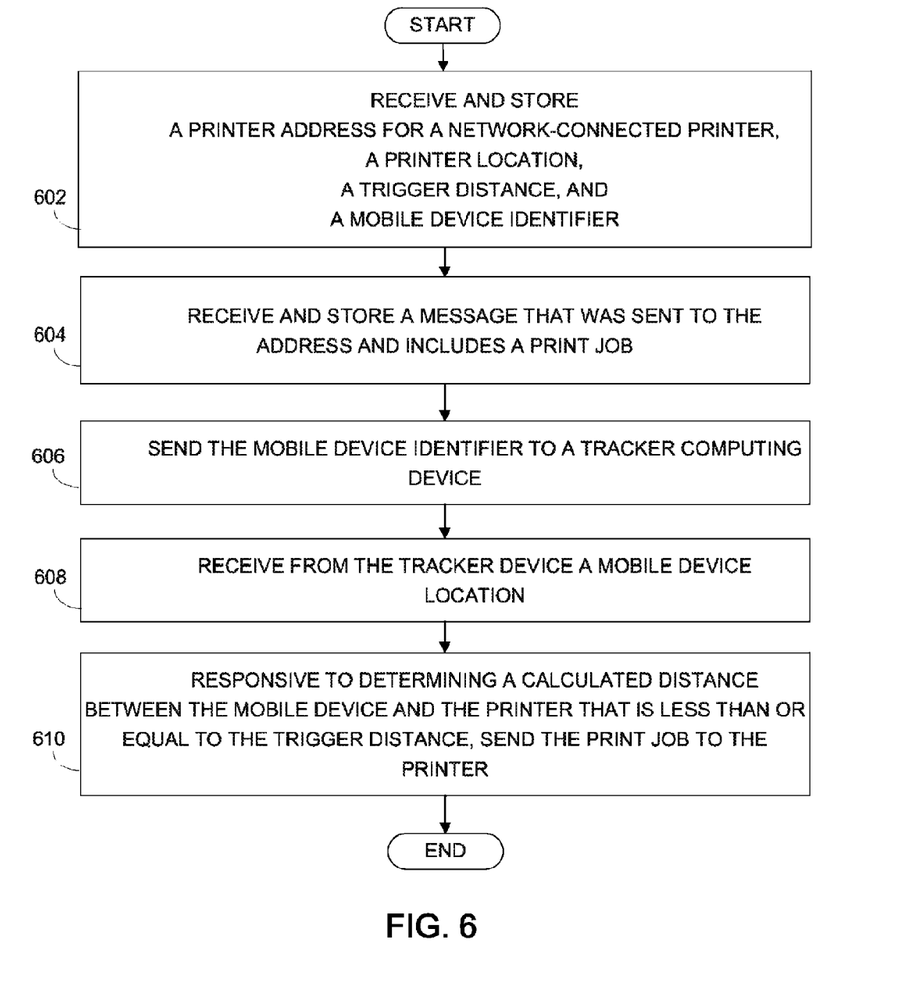
FIG. 6 is a flow diagram depicting steps taken to implement various examples.

FIG. 6 is a flow diagram of operation in a system according to various examples. In discussing FIG. 6, reference may be made to the diagrams of FIG. 5 to provide contextual examples. Implementation, however, is not limited to those examples. Starting with FIG. 6, a printer address for a network-connected printer, a printer location, a trigger distance, and a mobile device identifier are received and stored (block 602). Referring back to FIG. 5, setup module 582 may be responsible for implementing block 602.

Continuing with FIG. 6, a message that was sent to the printer address and includes a print job is received and stored (block 604). Referring back to FIG. 5, job receipt module 584 may be responsible for implementing block 604.

Continuing with FIG. 6, the mobile device identifier is sent to a tracker computing device (block 606). Referring back to FIG. 5, job release module 586 may be responsible for implementing block 606.

Continuing with FIG. 6, a mobile device location is received from the tracker device (block 608). Referring back to FIG. 5, job release module 586 may be responsible for implementing block 608.

Continuing with FIG. 6, responsive to determining a calculated distance between the mobile device and the printer that is less than or equal to the trigger distance, the print job is to the printer. (block 610). Referring back to FIG. 5, job release module 586 may be responsible for implementing block 610.

Various modifications may be made to the disclosed examples and implementations without departing from their scope. Therefore, the illustrations and examples herein should be construed in an Illustrative, and not a restrictive, sense.

What is claimed is:

1. A non-transitory computer-readable storage medium comprising instructions that, when executed by a processor, cause a system to:

receive in a memory of the system:
a printer address for a printer,
a printer location,
an identifier for a mobile device;

responsive to receiving a message sent to the printer address and including a job, store the job;

send the identifier to a tracker device, wherein the tracker device is distinct from the printer, the mobile device, and the system;

receive, from the tracker device, a mobile device location;

calculate a distance between the mobile device and the printer; and responsive to determining the calculated distance is less than or equal to a trigger distance, send the job to the printer.

2. The medium of claim 1, wherein the printer address is an email address and the message is an email.

3. The medium of claim 1, wherein the mobile device location is received after receipt of the message.

4. The medium of claim 1, wherein the instructions cause the system to send to the tracker device a request for the mobile device location.

5. The medium of claim 4, wherein the instructions cause the system to send the request after receipt of the message.

6. The medium of claim 1, wherein the identifier is sent to the tracker device as part of, or with, a request for the mobile device location.

7. The medium of claim 1, wherein the printer location and the mobile device location each include a latitude and a longitude.

8. The medium of claim 1, wherein the printer location and the mobile device location each include an altitude.

9. The medium of claim 1, wherein the identifier is an IMEI number.

10. A system, comprising a memory and a processor to execute instructions stored in the memory to implement modules, the modules comprising:

a setup module, to receive
a printer address for a printer,
a printer location,
an identifier of a mobile device;

a job receipt module, to receive a message sent to the printer address, and store a job included within the message;

a job release module, to
send the identifier to a tracking device;
receive a mobile device location from the tracker device that is a device other than the printer, the mobile device, and the system; and
determine a proximity between the mobile device and the printer; and
if the determined proximity is less than or equal to a trigger proximity, send the job to the printer.

11. The system of claim 10, wherein the printer address is an email address and the message is, or includes, an email.

12. The system of claim 10, wherein the identifier is a telephone number.

13. The system of claim 10, wherein the printer address, the printer location, or the identifier is received via a printer application accessed by a user at the printer.

14. The system of claim 13, further comprising a printer application module, to send the printer application to the printer.

15. A computer-implemented method, comprising:
  receiving and storing at a memory of a system:
    a printer address for a printer,
    a printer location,
    an identifier of a mobile device;
  storing a trigger distance;
  receiving and storing a message sent to the printer address and including a job;
  sending the identifier to a tracker device, wherein the tracker device is distinct from the printer, the mobile device, and the system;
  receiving, from the tracker device, a mobile device location, and
  responsive to determining a calculated distance between the mobile device and the printer that is less than or equal to the trigger distance, send the job to the printer.

16. The method of claim 15, further comprising receiving the trigger distance.

17. The method of claim 15,
  wherein the printer is a first printer;
  wherein the printer address is a common address for a set of printers including the first printer;
  wherein the instructions cause the system to
    receive and store location data for each printer of the set, and
    calculate distances between the mobile device and each printer of the set.

18. The method of claim 15 wherein the job is sent to the first printer responsive to determining that the first printer is the sole printer among the set within the trigger distance of the mobile device.

19. The method of claim 15,
  wherein the first printer is one of a plurality of printers of the set within the trigger distance of the mobile device; and
  wherein the job is sent responsive to determining that the first printer is the closest, relative to the other printers of the plurality, to the mobile device.

* * * * *